May 25, 1943.  O. D. MARKINS  2,319,938
POULTRY RESTRAINING DEVICE
Filed March 3, 1942  2 Sheets—Sheet 1
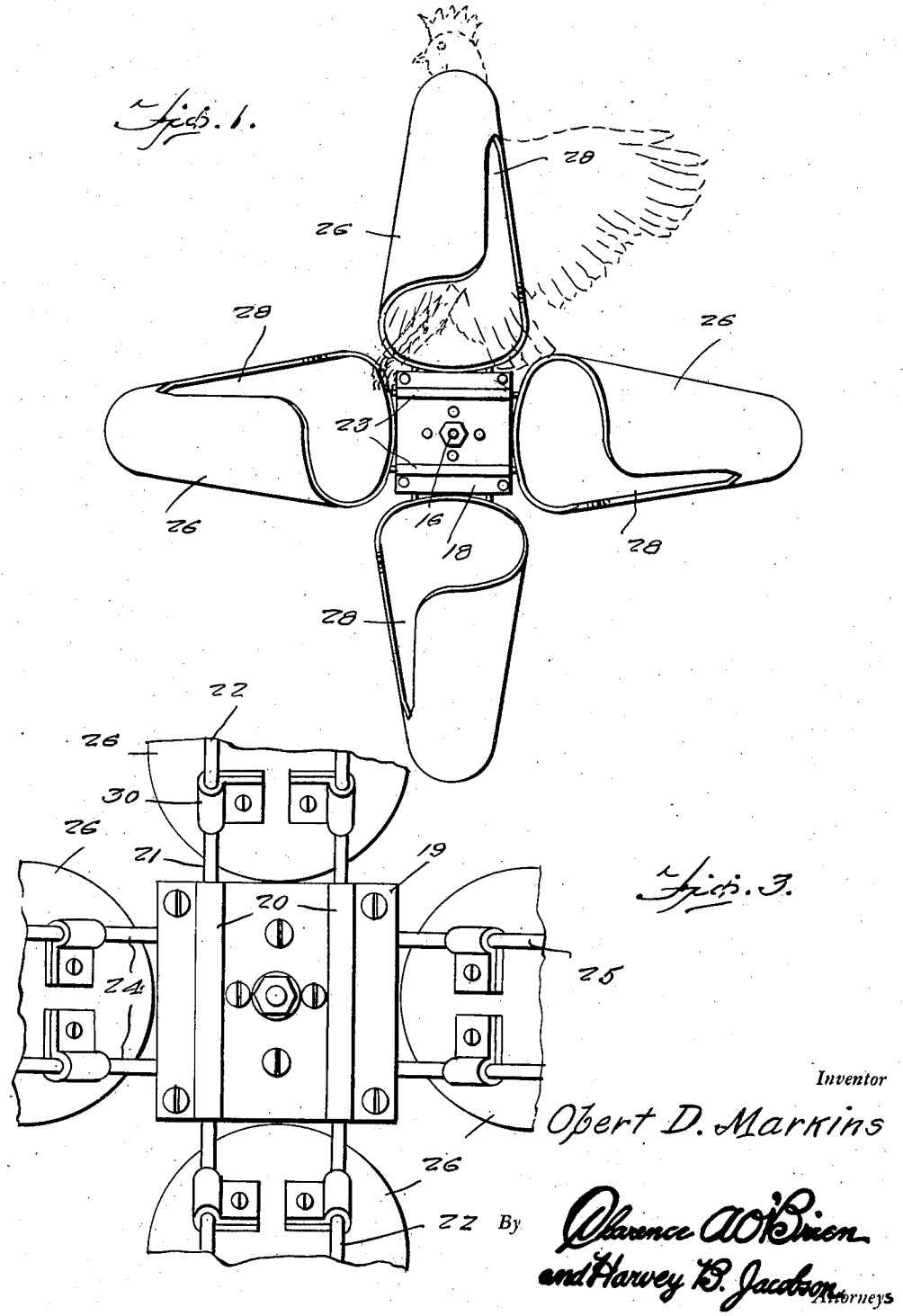
Inventor
Opert D. Markins

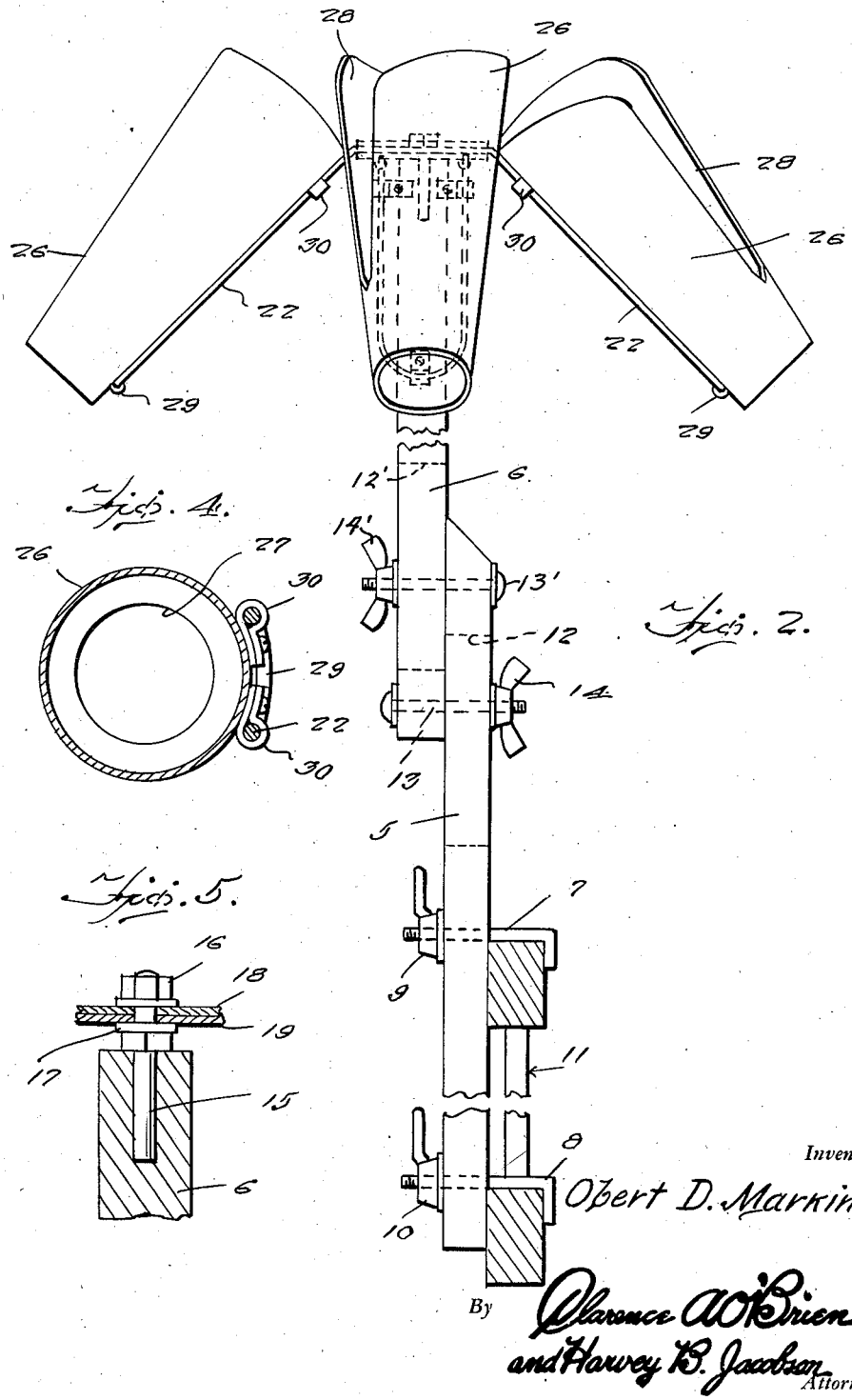

Patented May 25, 1943

2,319,938

UNITED STATES PATENT OFFICE 2,319,938

POULTRY RESTRAINING DEVICE

Obert D. Markins, Harrisonville, Ohio

Application March 3, 1942, Serial No. 433,220

2 Claims. (Cl. 119—97)

This invention relates to new and useful improvements in poultry restraining or holding devices and more particularly to an apparatus for holding poultry while blood tests are being made or in instances where various vaccinations are to be given.

The principal object of the present invention is to provide a poultry restraining device for holding fowls securely and accurately so that blood may be drawn from a wing for the purpose of blood testing.

Another important object of the invention is to provide a poultry restraining apparatus which may be used also in wing vaccinations, wing banding or tatooing, head or vent vaccinations, leg banding and other operations.

Another object of the invention is to provide a rotary fowl holding apparatus whereby several attendants can have control over several fowls for quick and convenient action on the restrained fowls.

Other objects and advantages of the invention will become apparent to the reader of the following description.

In the drawings:

Figure 1 is a top plan view.

Figure 2 is a fragmentary side elevational view.

Figure 3 is a fragmentary bottom plan view with the posts removed.

Figure 4 is a cross sectional view through one of the sleeves.

Figure 5 is a fragmentary sectional view through the rotary mount.

Referring to the drawings wherein like numerals designate like parts, it can be seen that the apparatus includes a post structure comprising sections 5, 6, the section 5 having clamp members 7, 8 disposed therethrough and provided with nuts 9, 10. These clamp members are intended to engage upper and lower portions of a crate generally referred to by numeral 11 or some other suitable supporting structure.

The upper portion of the post section 5 has a slot 12 therein for receiving a bolt 13 which is fixed in the lower end of the section 6. The lower end of the post section 6 has a slot 12' therein similar to slot 12, and a bolt 13' similar to bolt 13 fixed in the upper end of the section 5 extends through said slot 12'. Obviously, by loosening the nuts 14 and 14' on the bolts 13 and 13', the sections can be adjusted longitudinally with respect to each other.

The upper end of the post section 6 has a pin 15 protruding therefrom which turns freely therein, the upper portion of the pin 15 being threaded to accommodate a nut 16, while a bearing structure 17 is on the pin 15 adjacent the post section 6. Interposed between the bearing 17 and the nut 16 are clamp plates 18, 19.

The clamp plate 19 has transversely extending grooves 20, 20 for receiving the laterally disposed end portions 21 of U-shaped bails 22, 22, while the plate 18 has transversely extending grooves 23, 23, disposed at right angles to the grooves 20, 20 for accommodating the laterally disposed end portions 24, 24 of U-shaped bails 25.

It can be seen that there are four U-shaped bails 22, 24 disposed in the manner shown in Figure 3 but, of course, there may be more depending upon the plate structure 18, 19 or some other mounting structure.

Supported by these bails 22, 25 are poultry restraining sleeves 26, each being of frustro-conical shape, the same being entirely open at their large ends while being formed with substantially small openings 27 at their smaller ends through which the heads of poultry can protrude. Each of the sleeves 26 has a longitudinally extending opening 28 to permit access to the legs and at least one wing of the restrained fowl.

The sleeves 26 are supported by having the bight portions of the U-shaped bails 22, 25 pass through clamp members 29 and also clamp members 30 which embrace the leg portions of the bails.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a poultry restraining device, a post structure, clamps on the lower end of said structure for attaching the structure in upright position to a support, a frusto-conical poultry holding sleeve, and means to mount said sleeve on said post structure in laterally offset relation thereto and to incline downwardly and outwardly therefrom comprising a plate mounted on top of said post structure, a U-shaped, rod-like bail having oblique end portions attached to said plate and a bight portion inclining downwardly and outwardly from said plate and fixed to one side of said sleeve.

2. In a poultry restraining device, a post structure, clamps on the lower end of said structure for attaching the structure in upright position to a support, a frusto-conical poultry holding sleeve, and means to mount said sleeve on said post structure in laterally offset relation thereto and to incline downwardly and outwardly therefrom comprising a plate rotatably mounted on top of said post structure, a U-shaped, rod-like bail having oblique end portions attached to said plate and a bight portion inclining downwardly and outwardly from said plate and fixed to one side of said sleeve, said post structure including relatively adjustable sections whereby the height of the structure may be varied at will to variably elevate the sleeve relative to said support.

OBERT D. MARKINS.